United States Patent [19]

McCombie

[11] 4,339,025

[45] Jul. 13, 1982

[54] APPARATUS FOR FEEDING ARTICLES

[75] Inventor: Alan K. McCombie, London, England

[73] Assignee: Molins, Ltd., London, England

[21] Appl. No.: 896,381

[22] Filed: Apr. 14, 1978

Related U.S. Application Data

[60] Division of Ser. No. 597,431, Jul. 21, 1975, Pat. No. 4,099,608, which is a division of Ser. No. 234,833, Mar. 15, 1972, abandoned, which is a continuation of Ser. No. 875,402, Nov. 10, 1969, abandoned.

[30] Foreign Application Priority Data

| Nov. 14, 1968 | [GB] | United Kingdom | 54034/68 |
| Jan. 24, 1969 | [GB] | United Kingdom | 4195/69 |
| Jan. 24, 1969 | [GB] | United Kingdom | 4196/69 |
| Feb. 14, 1969 | [GB] | United Kingdom | 8313/69 |
| Feb. 28, 1969 | [GB] | United Kingdom | 10941/69 |

[51] Int. Cl.$^3$ .................. B65G 37/00; B65G 1/04
[52] U.S. Cl. .................. 198/347; 198/572; 198/778
[58] Field of Search .......... 198/347, 572, 573, 778, 198/855

[56] References Cited

U.S. PATENT DOCUMENTS

| 3,355,004 | 11/1967 | Rupert | 198/572 |
| 3,433,347 | 3/1969 | Molins et al. | 198/347 |
| 3,450,250 | 6/1969 | Frisk | 198/778 |
| 3,472,358 | 10/1969 | Poupin | 198/347 |
| 3,561,585 | 2/1971 | McCombie | 198/573 |
| 4,023,669 | 5/1977 | Clarke | 198/347 X |
| 4,078,648 | 3/1978 | Hinchcliffe et al. | 198/347 |

FOREIGN PATENT DOCUMENTS 1301843  1/1973  United Kingdom ............... 198/347

Primary Examiner—Jeffrey V. Nase
Attorney, Agent, or Firm—Craig and Antonelli

[57] ABSTRACT

A conveyor system for cigarettes and other rod-like articles includes a reservoir consisting of a conveyor which is preferably laterally flexible and moves along a helical path so that a long thin stack of articles can be taken into the reservoir and can be delivered from the reservoir when necessary. The conveyor may consist of a plastic surface member which has a flexible zig-zag shape and is driven by a chain. The conveyor system may be overhead and may receive the articles from an elevator consisting of two parallel bands moving upwards along a sinuous path so as to grip the articles between them.

37 Claims, 23 Drawing Figures

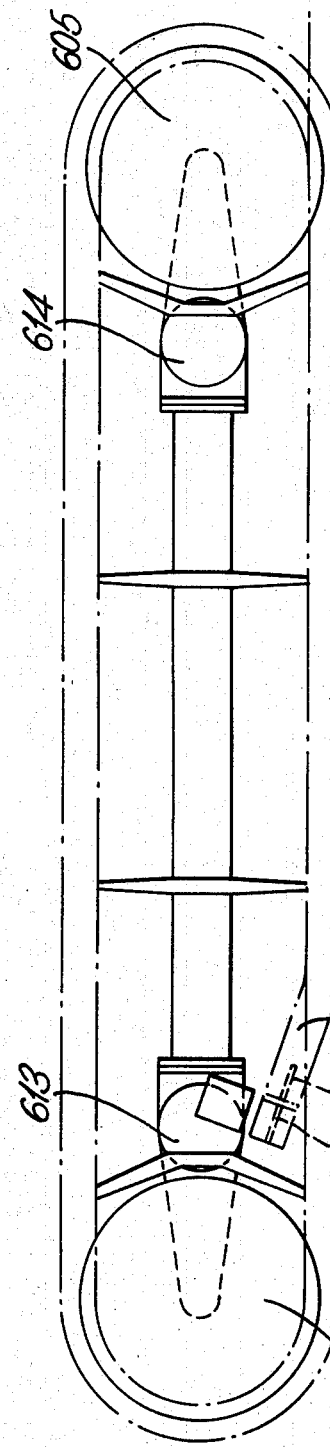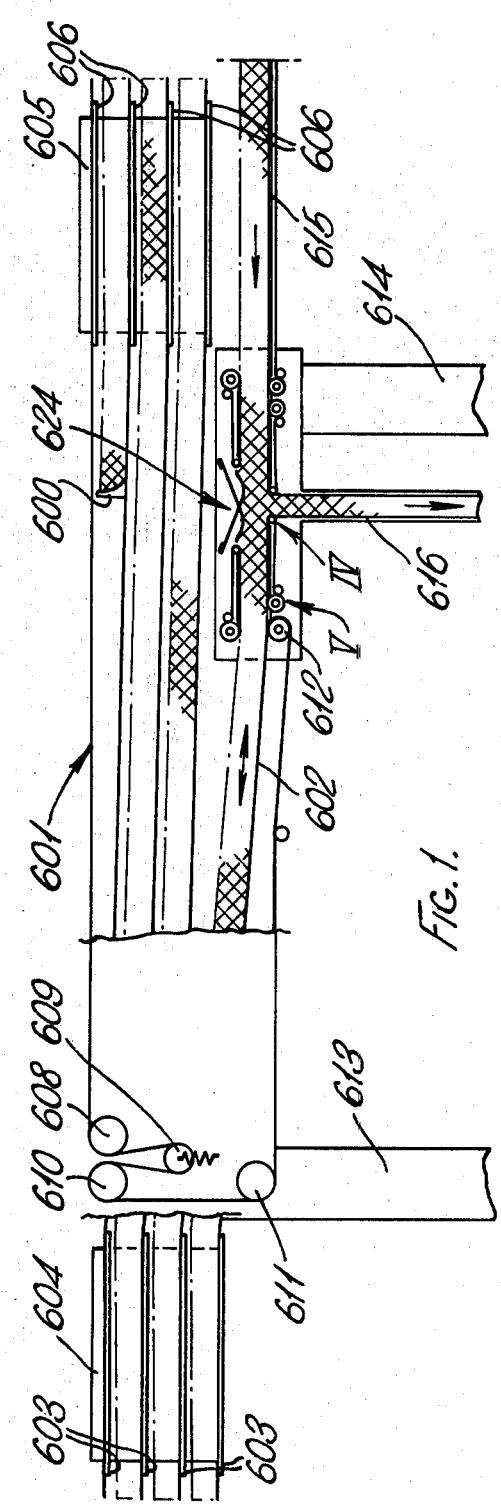

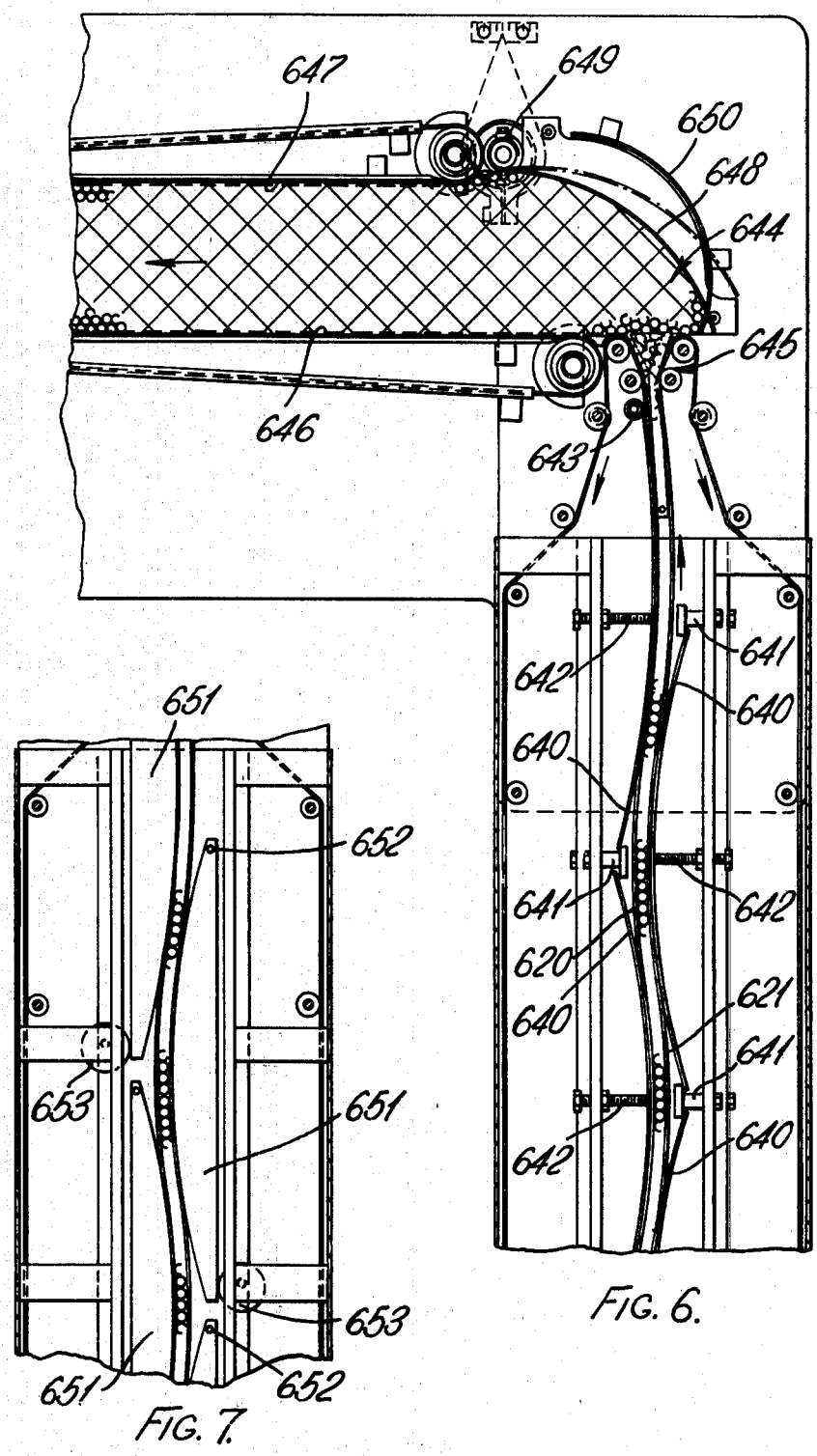

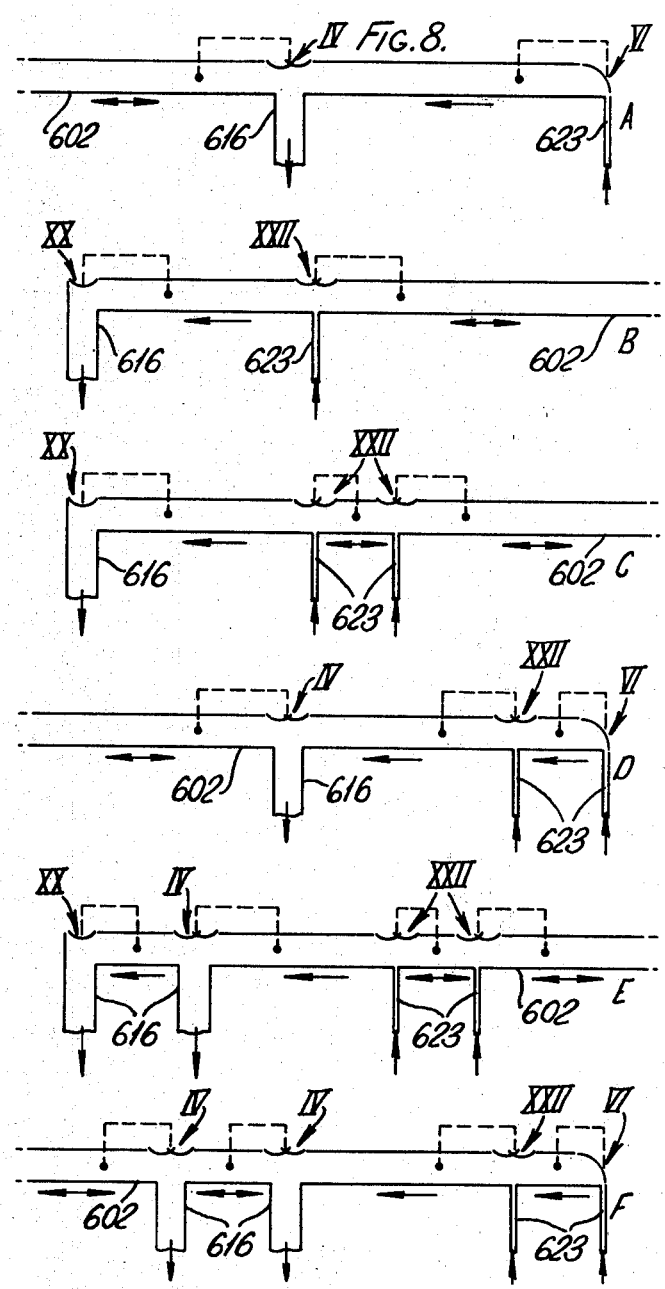

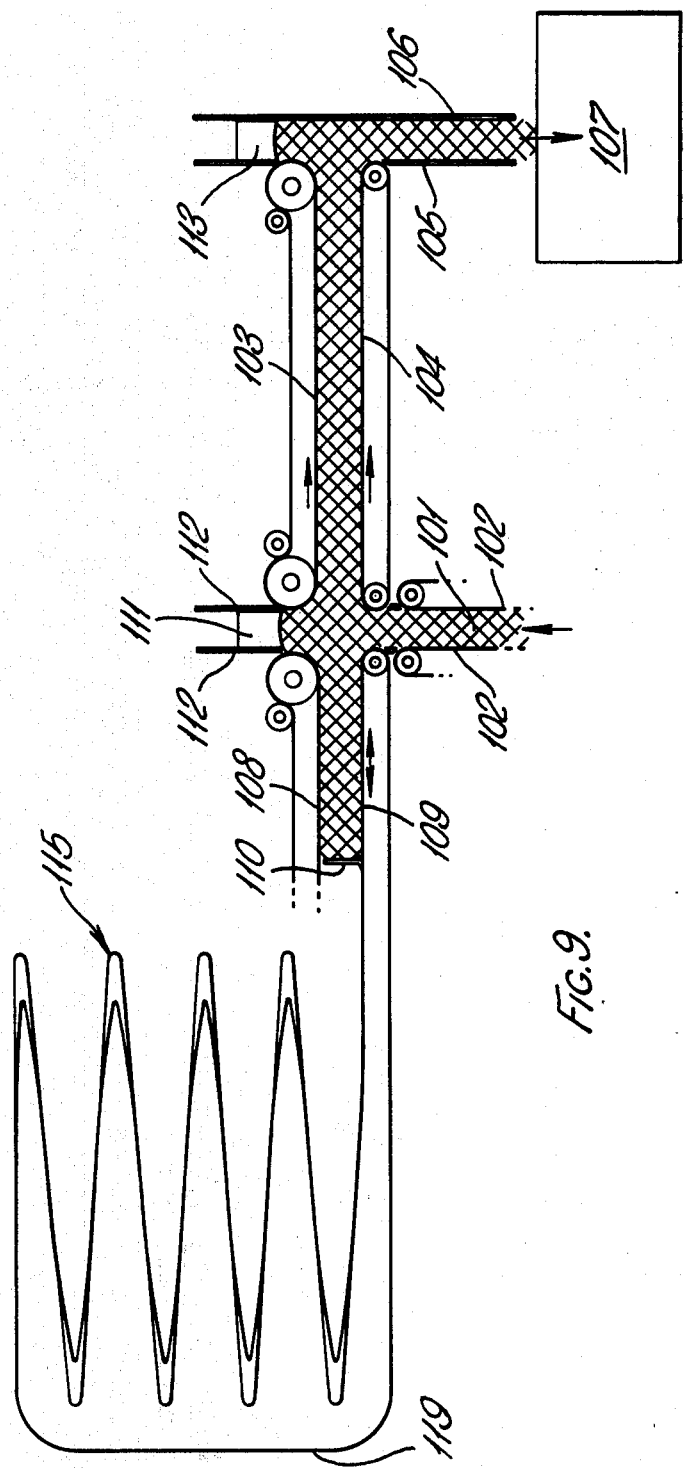

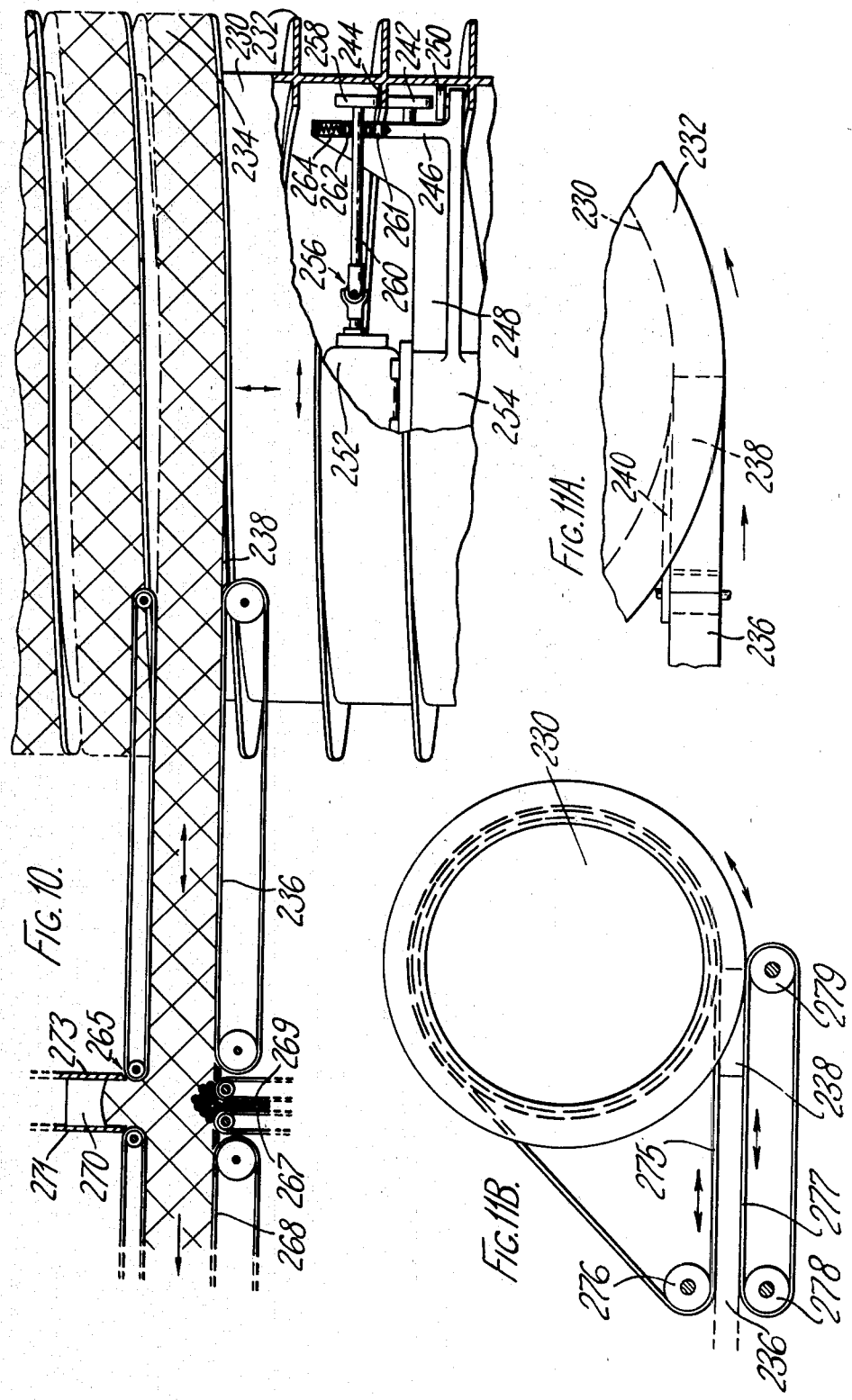

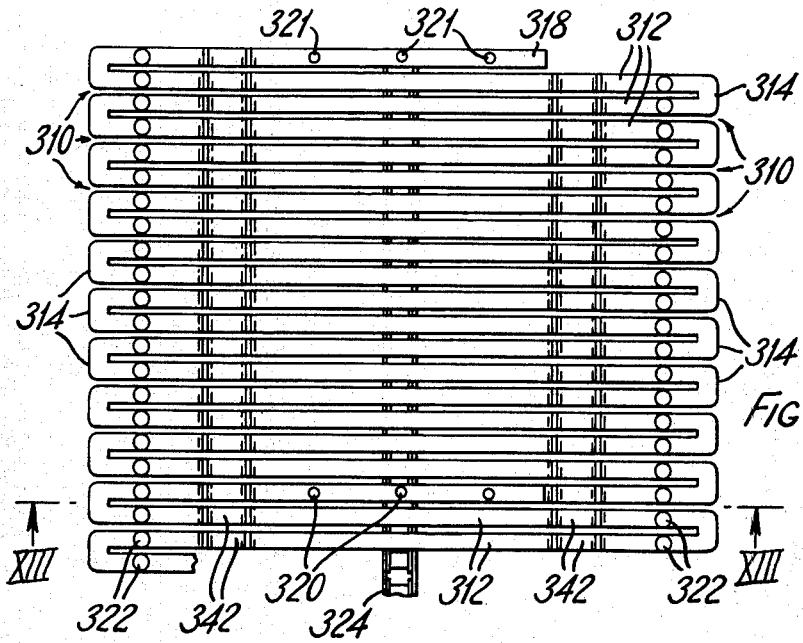
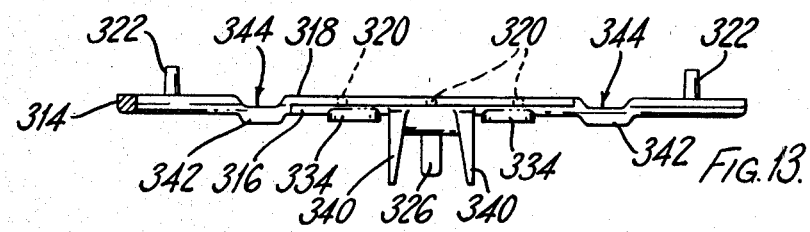
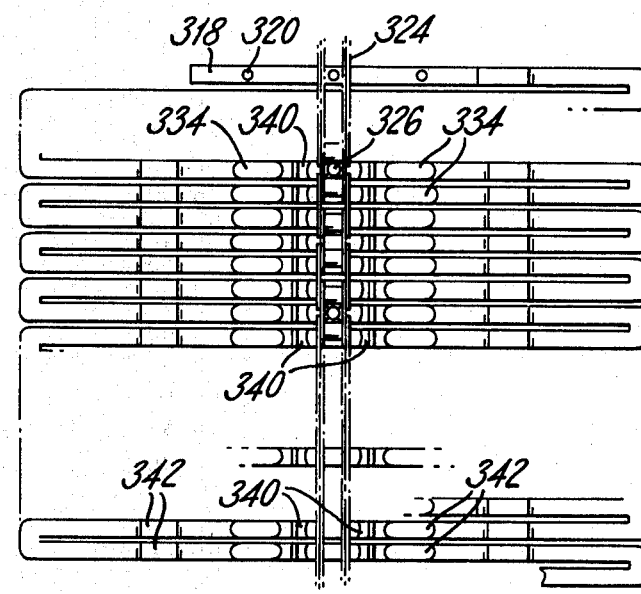

APPARATUS FOR FEEDING ARTICLES

This is a division of application Ser. No. 597,431, filed July 21, 1975, now U.S. Pat. No. 4,099,608, which is a division of prior application Ser. No. 234,833, filed Mar. 15, 1972, now abandoned, which was a continuation of prior application Ser. No. 875,402, filed Nov. 10, 1969, now abandoned.

This invention is particularly concerned with the feeding of cigarettes, but it is also applicable to the feeding of other rod-like articles, for example cigarette filter rods or cigars.

Various proposals have been made for feeding for example cigarettes from one or more cigarette-making machines to one or more cigarette-packing machines with the aid of a variable-capacity reservoir which absorbs or makes up the difference between the rates of supply and demand. One aspect of the present invention is concerned particularly with an improved reservoir. According to this aspect of the invention a conveyor system for feeding cigarettes or other rod-like articles sideways between an article-delivery device and an article-receiving device (which receives the articles in stack formation) includes a variable-capacity reservoir comprising a conveyor which serves as the floor of the reservoir and which, when the reservoir is at maximum capacity, carries a long stack of articles of which the length is considerably greater than the thickness which is approximately the same as the thickness of the stack delivered to the article-receiving device.

An advantage of this arrangement is that the articles (and this is especially important if they are cigarettes) are subjected to less relative jostling or rolling than occurs when a thick stack in the reservoir has to be transformed into a much thinner stack as required by the article-receiving device (for example a cigarette packing machine). Indeed in a preferred system according to this invention the articles are carried into the reservoir as a stack of uniform thickness and remain in the reservoir in the same stack formation and are carried out of the reservoir while still in the same stack formation, so that from the form the moment the articles enter the reservoir, to the moment they leave the reservoir, there is little or no relative movement between the articles.

The reservoir may extend along a path which includes lateral bends, in which case the conveyor forming the floor of the reservoir is made laterally flexible. The path preferably includes a helix. A suitable conveyor for this purpose comprises a conveyor surface member which is flexible so as to be capable of passing round a pulley and is slotted at regular intervals from both edges so as to be capable of curving laterally; such a conveyor is also useful in its own right for other purposes.

The term "helix" in this context is not intended to be limited to a cylindrical helix, that is to say with circular turns; the turns of the helix could for example be oval.

A preferred reservoir according to this invention is one in which the articles enter and leave at the same end. In other words the conveyor serving as the floor of the reservoir moves in one direction to carry articles into the reservoir and in the opposite direction to carry articles out of the reservoir. As an alternative, however, the articles could enter and leave the reservoir at opposite ends, as in the arrangement described in British Pat. No. 995,663; for this purpose the reservoir could in effect comprise a series of reservoirs (like that shown in U.S. Pat. No. 995,663) connected one above the other so that the complete reservoir extends to and fro along several horizontal passes in zig-zag fashion and forms a channel of uniform width to receive a stack of uniform thickness, the stack being fed in at one end (for example the upper end) and being discharged at the other end, and the capacity of the reservoir would be varied by varying the length of the horizontal passes, as in U.S. Pat. No. 995,663.

As already mentioned, the reservoir is arranged to receive a stack of which the length is considerably greater than the thickness. As an example, in the case of a cigarette factory, the length of the stack which can be received by the reservoir may be 30 to 90 meters, and would rarely be less than 12 meters. This length may be arranged to wind its way around the factory wherever there is space available, preferably without the path of the reservoir having any steep sections, for example over 10° to the horizontal, so that the cigarettes will remain in place (i.e. not roll about) without needing a top cover band.

Examples of various arrangements according to this invention are shown in the accompanying drawings. In these drawings:

FIG. 1 is a side view of part of one conveyor system including the reservoir;

FIG. 2 is a plan view of the reservoir;

FIG. 6 is an enlarged view of a portion indicated by the arrow VI in FIG. 3 and including part of the elevator;

FIG. 7 shows a possible modified form of elevator;

FIG. 8 shows diagrammatically six different systems according to this invention;

FIG. 9 shows another different system;

FIG. 10 is a side view of another different system including particularly a different reservoir;

FIGS. 11A and 11B show, in plan view, alternative ways of feeding the cigarettes into and out of the reservoir;

FIG. 12 is a plan view of part of a laterally flexible conveyor which forms the floor of the reservoir in FIG. 1;

FIG. 13 is a section on the line XIII-XIII in FIG. 12;

FIG. 14 is an underneath view;

Figure 3:
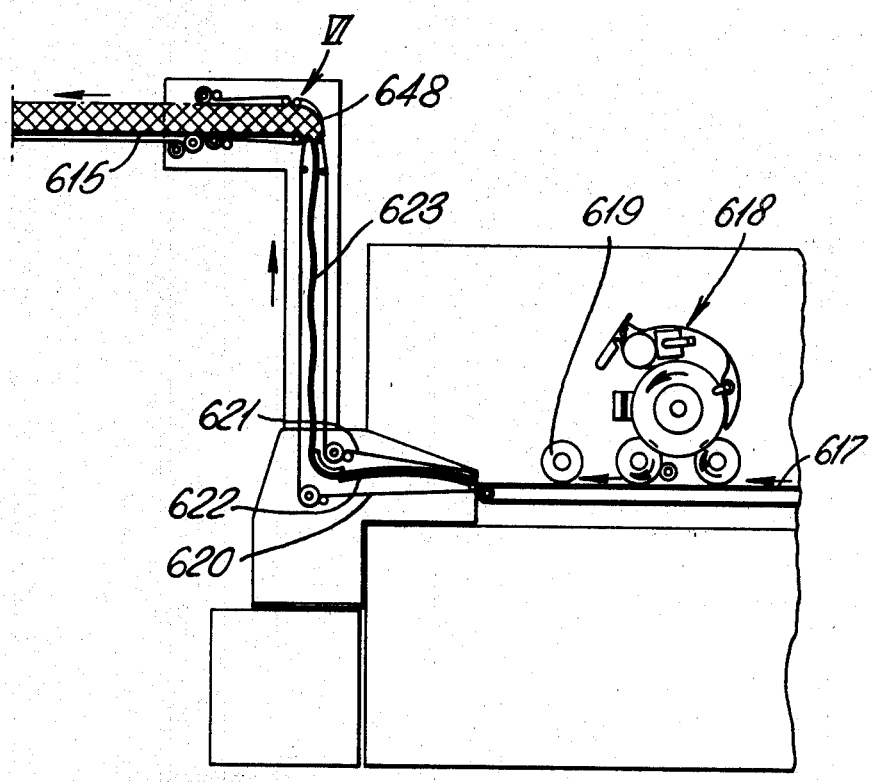
FIG. 3 is a side view of another part of the system which joins up with the part shown in FIG. 1.

The invention will be described with reference to its use in connection with cigarettes, but it should be understood that it can also be used in connection with other rod-like articles.

FIG. 1 shows part of a conveyor system which includes a helical reservoir 601 comprising a laterally flexible conveyor 602 which moves up a slightly inclined track leading to one of four flanges 603 on a rotatable drum 604 and then passes round the drum 603 (being supported by the flange 603). The conveyor, which comprises a plastic surface member connected to a chain (as shown in FIGS. 12 to 17), is then carried by a track (not shown) towards a second drum 605 which has four support flanges 605. The conveyor then passes to and fro around the drums along a helical path, being supported by the flanges while passing round the drums. At the top of the helix, the conveyor is deflected inwards at 607 and then passes over and round a sprocket 608 engaging the chain, down and below a tensioning pulley 609, and then upwards and over a sprocket 610. Finally the conveyor returns round further sprockets 611 and 612.

Figure 4:
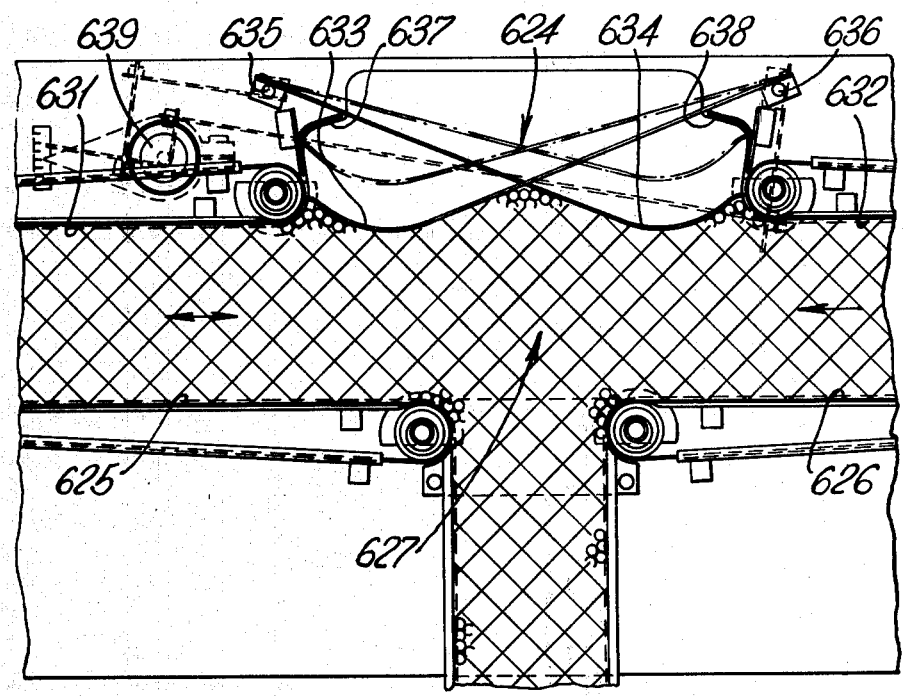
FIG. 4 is an enlarged view of a portion indicated by the arrow IV in FIG. 1.

The reservoir is mounted overhead on pillars 613 and 614 and is connected to a horizontal overhead conveyor 65 at a junction IV which is shown in detail in FIG. 4. A chute 616 extends downwards from the junction and supplies cigarettes to a cigarette packing machine (not shown).

FIG. 3 shows how the cigarettes are fed on to the conveyor 615. A conveyor 617 delivers a single row of cigarettes (moving sideways) from a cigarette-making machine (not shown). The cigarettes are picked up by a cigarette testing device 618 which then returns the cigarettes to the conveyor 617. Any faulty cigarettes are ejected by a device 619.

At the end of the conveyor 617 the cigarettes are picked up between two parallel bands 620 and 621 which are constrained to move along a continuously curving path so as to grip the cigarettes substantially all the way owing to the tension in whichever band is on the outside of the curve. The bands move the cigarettes firstly along an horizontal path 622 and then up a sinuous elevator 623 which is shown more clearly in FIG. 6. At the upper end of the elevator the cigarettes form a stack and are carried away in stack formation by the conveyor 615. The speed of the conveyor 615 varies in response to the height of a sensor 624 in a manner which will be described with reference to FIG. 6, which is an enlarged view of the part of the system indicated by the arrow VI in FIG. 3.

As an alternative to the arrangement shown in FIG. 3, a testing device 618 may deposit the cigarettes straight on to the band 620 (which would in that case be extended somewhat to the right) without the intermediary of the conveyor 617.

During operation of the conveyor system, cigarettes pass down the chute 616 at the rate demanded by the cigarette packing machine. So long as cigarettes are supplied by the cigarette making machine at the same rate, that is to say via the conveyor 615, the reservoir conveyor 602 remains stationary. However, when the rate of supply by the maker exceeds the rate of demand by the packer, or when the packer is temporarily stopped, the conveyor 602 carries cigarettes to the left from the junction IV and into the reservoir at a speed determined by a double-plate sensor 624 which will be described more fully with reference to FIG. IV. Conversely, when demand exceeds supply (and assuming of course that the reservoir does at that time contain some cigarettes), or when the maker stops temporarily, the deficiency at the junction IV is made up by the reservoir conveyor which then moves to the right at a speed determined by the double sensor 624.

Figure 5:
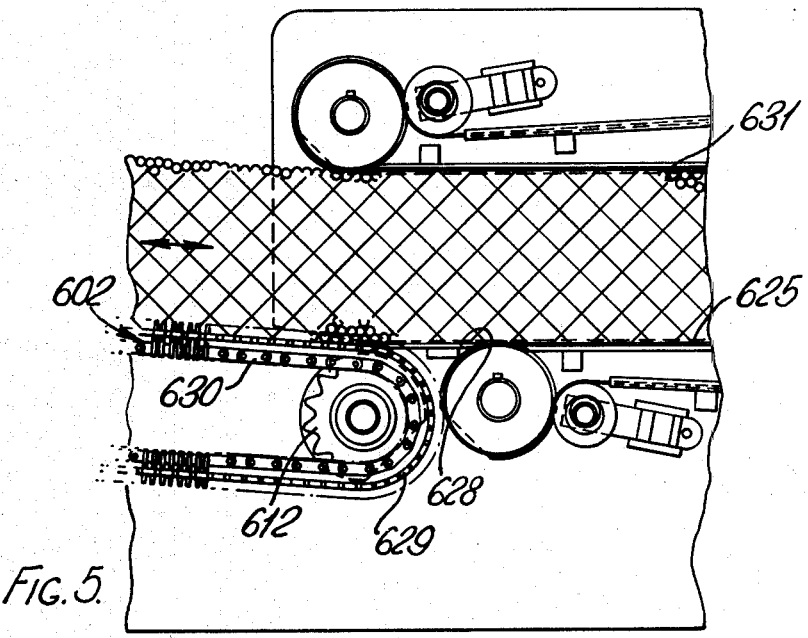
FIG. 5 is an enlarged view of a portion indicated by the arrow V in FIG. 1.

The conveyor 602 is driven by a drive sprocket (for example the sprocket 611) engaging the conveyor chain which is shown particularly in FIG. 5. The drums 604 and 605 of the reservoir are arranged to be driven at the same peripheral speed as the conveyor 602.

The end of the stack of cigarettes in the reservoir is preferably defined by an end wall 600 connected to the conveyor 602. A preferred arrangement will be described with reference to FIGS. 18 and 19.

The conveyor 615 may be a laterally flexible conveyor (for example like the conveyor 602) so that it can be arranged, if necessary, to move along a path including for example a right-angle bend.

FIG. 4 shows in detail the T-junction between the overhead conveyors 602 and 615 and the chute 616. More particularly FIG. 4 shows parts of two band conveyors 625 and 626 which extend respectively between the the conveyors 602 and 615 and a junction zone 627. FIG. 5 shows for example how the cigarette stack passes over a stationary bridge 628 in passing from the band conveyor 626 to the conveyor 602 or vice versa. FIG. 5 shows also that the conveyor 602 consists of a surface member 629 connected to a chain 630, as will be described more particularly with reference to FIGS. 12 to 17.

Each of the band conveyors 625 and 626 has an associated parallel band conveyor 631 or 632 which forms a moving roof for the stack of cigarettes and moves at the same speed as the respective band conveyor 625 or 626 (which is the same as the speed of the conveyor 602 or 615). Once the stack has been properly formed, for example as it enters the reservoir, no stationary or moving roof is needed to confine the upper surface of the stack. The vertical spacing between the flanges 603 and 606 on the drums 604 and 605 of the reservoir is sufficient to leave clearance between the cigarette stack and the flange above it.

The sensor 624 above the junction zone 627 comprises two plates 633 which are pivoted at 635 and 636 respectively so as to be able to swing up and down in response to the pressure of the cigarettes below them. They are shown in solid outline in their lowest position in which they engage the upper edges of two walls 637 and 638 which also determine the highest possible positions of the plates (shown in broken outline) and help to confine the cigarettes in the junction zone.

Figure 22:
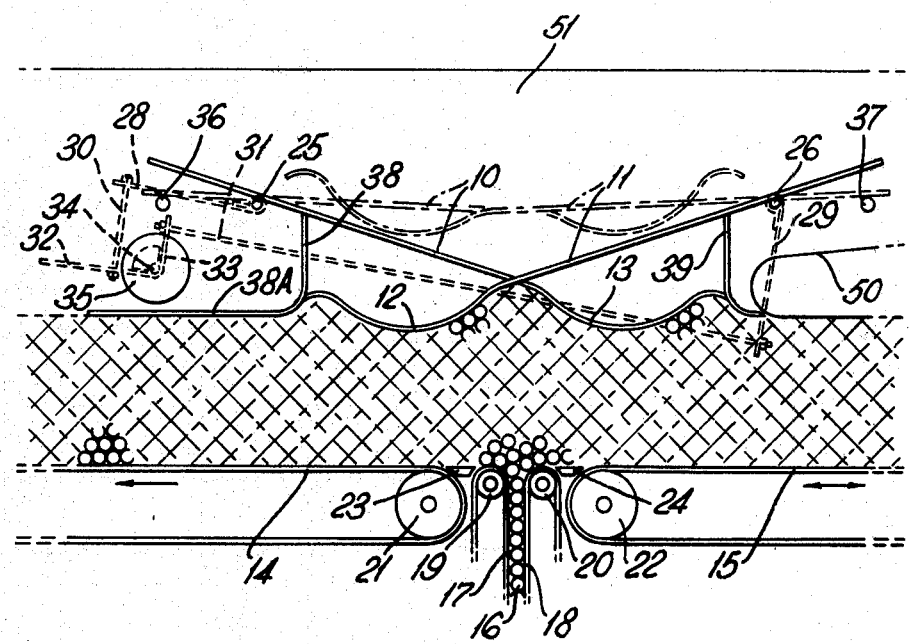
FIG. 22 is an enlarged view of one of the sensor mechanisms XXII shown in FIG. 8.
Figure 23:
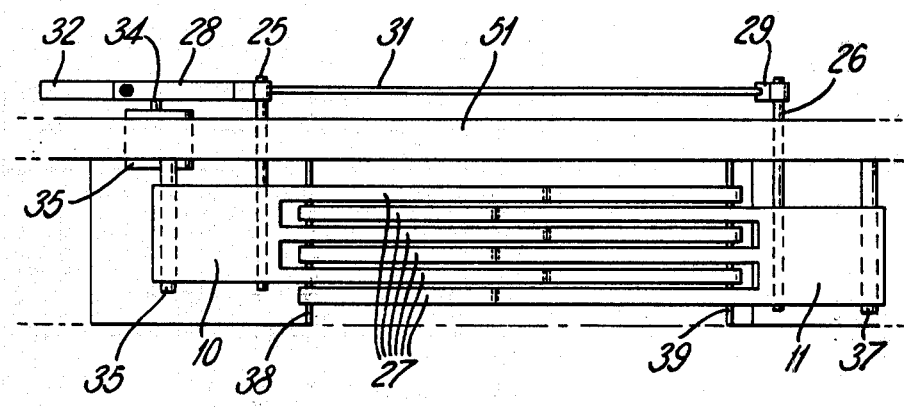
FIG. 23 is a plan view of the arrangement shown in FIG. 22.

The sensor 624 is basically the same as the sensor shown in FIGS. 22 and 23 in that the two sensor plates are connected by a lost-motion linkage to a regulating mechanism 639 so that the position of the regulating mechanism is determined by whichever of the plates is lower. The regulating mechanism in this case controls the direction and speed of movement of the band conveyor 625 and reservoir conveyor 602. Further details may be seen from the description relative to FIGS. 22 and 23.

FIG. 6 shows in enlarged scale the part of the system indicated by the arrow VI in FIG. 3.

As shown in FIG. 6, the parallel bands 620 and 621 of the elevator are constrained to move upwards along a curved sinuous path by means of a number of staggered and oppositely facing curved plates 640. Each plate (with the exception of the top one) has its ends held by anchor members 641 and is flexed into a curved state by an adjustable screw 642. The top plate instead has its upper end anchored round a pin 643. The screws 642 can be screwed in or out to vary the gap between opposite plates in accordance with the needs of different cigarettes with different diameters. The bands 620 and 621 are kept in tension (for example by means of idler tensioning pulleys) so that the cigarettes are always gripped by whichever band is on the outside of the curve.

As the bands 620 and 621 approach a junction zone 644 they diverge at 645 so that the spacing between the bands increases to a value equal approximately to three times a cigarette diameter. This helps to smooth the entry of the cigarettes into the junction zone 644.

From the junction zone 644 the cigarettes are carried away in stack formation by a band conveyor 646 with the aid of a parallel band conveyor 647 confining the upper surface of the stack. The band conveyors 646 and 647 are driven at a variable speed determined by the position of a curved sensor plate 648 which is connected to a rotary regulating mechanism 649 and wings up and down in accordance with the upward pressure of the cigarettes in the junction zone 644. The plate 648 is slotted so as to interleave with a stationary slotted guide plate 650.

Figure 20:
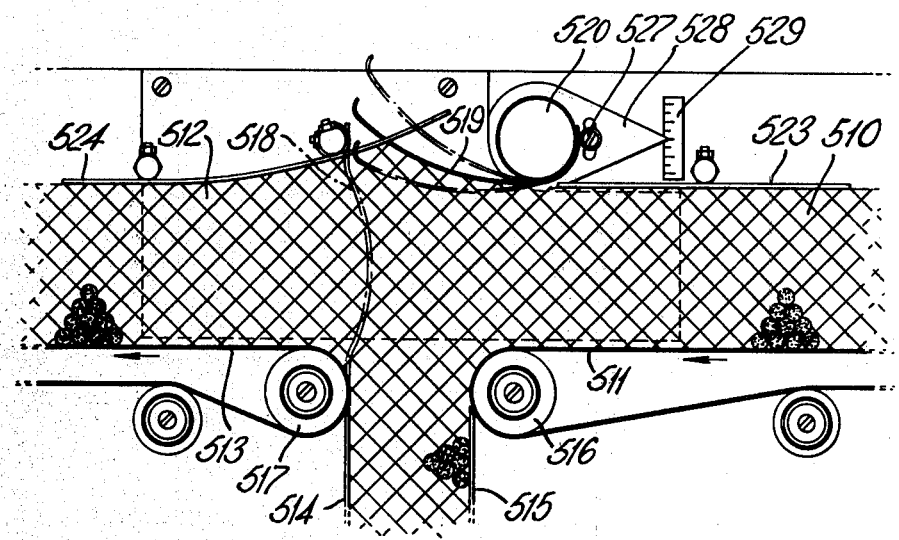
FIG. 20 is an enlarged view of one of the sensor mechanisms XX shown in FIG. 8.
Figure 21:
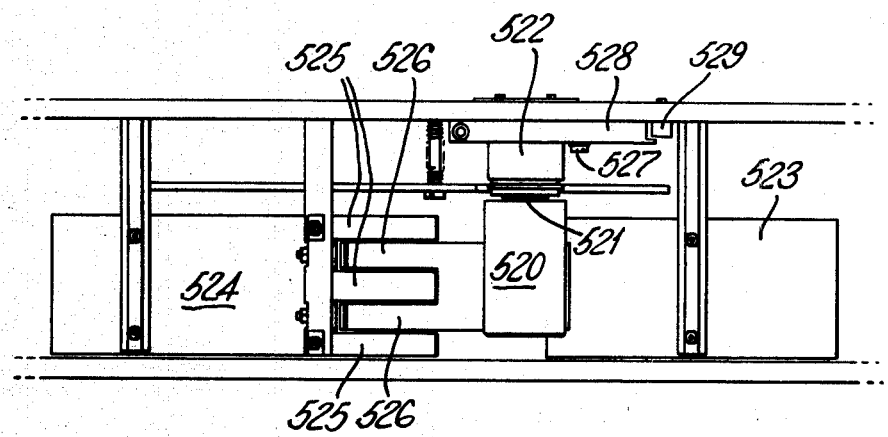
FIG. 21 is a plan view of the arrangement shown in FIG. 20.

The operation and adjustment of the regulating mechanism 649 is similar to that of the regulating mechanism 520 shown in FIGS. 20 and 21.

The conveyor 615 (see FIG. 3) receives the stack of cigarettes from the band conveyor 646 and is driven at the same speed.

It should be noted that the thickness of the cigarette stack (i.e. measured vertically) delivered from the junction zone 44 is the same as the stack thickness in the reservoir which is one example is approximately 9 cm. In general the stack thickness is preferably not less than say 7 cm (as this would necessitate an excessively long reservoir) and is not greater than say 11 cm for the sake of the desired gentle handling of the cigarettes. The thickness of the stack fed down the chute to the packer is approximately the same, being only slightly less. It should be noted that cigarettes shown in FIGS. 4 to 7 are not drawn exactly to scale.

FIG. 7 shows an alternative elevator construction. Instead of the flexible plates 640 there are rigid members 651 which are pivoted about their upper ends on pins 652. Adjustment of the gap between the members 651 is achieved by rotating into different angular positions a number of cams 653 bearing against the lower ends of the members 651.

The reservoir shown in FIGS. 1 and 2 has a relatively small capacity. In order to obtain a larger capacity, the distance between the drums 604 and 605 may be increased; alternatively the vertical extent of the reservoir may be increased, so as to include more flanges 603 and 606 and more turns of the helix.

FIGS. 8A to 8F show diagrammatically various different conveyor systems according to this invention. In each case the numeral 616 identifies a chute feeding a stack of cigarettes down to a packer, and the numeral 623 identifies an elevator (for example as shown in FIG. 6) feeding cigarettes upwards from a cigarette-making machine. The numeral 602 identifies a conveyor which forms part of the reservoir or feeds the cigarettes into the reservoir.

Four different parts of sensor are shown. The arrows IV, VI, XX and XXII indicate respectively sensors as shown in FIGS. 4, 6, 20 and 22. The broken lines indicate which stack conveyors are controlled by the various sensors.

It will be seen that FIG. 8A corresponds to the system shown in FIGS. 1 to 7. FIG. 8B shows an alternative system for linking one maker to one packer, where the reservoir is adjacent to the maker, instead of being adjacent to the packer as in FIG. 8A; an example of this is shown in FIGS. 10 and 11. FIGS. 8C and 8D show two ways of feeding one packer from two makers, and FIGS. 8E and 8F show two ways of feeding two packers from two makers.

FIG. 9 shows diagrammatically a further system which in basic layout is like FIG. 8B. Cigarettes 101 coming from one or more cigarette-making machines are conveyed upwards by opposed bands 102 in the manner disclosed in British Patent Specification No. 1,082,941. As shown, the cigarettes are conveyed in stack-formation between the bands 102; they could, however, be conveyed as a single row, the bands being suitably close together for this purpose. The normal flow path of these cigarettes is towards the right as viewed in the drawing, between opposed endless bands 103 and 104, which convey the cigarettes to a chute indicated in the drawing by walls 105 and 106 and leading to the hopper of a cigarette-making machine 107; more than one such chute can be provided, serving more than one packing machine, as disclosed in French Patent specification No. 1,509,322.

Extending to the left in the drawings are opposed endless conveyors 108 and 109; a wall 110 is mounted on the conveyor 109 for movement therewith. The conveyors 108 and 109 are at time stationary and at other times move in one direction or the other, as indicated by the double-headed arrow. These two conveyors and the wall 110, constitute a reservoir for cigarettes. The upper conveyor 108 can if desired be replaced by a stationary top plate, or it can be arranged to extend a short distance, a stationary plate being provided beyond that as a continuation of the conveyor 108.

Bridging the gap between conveyors 103 and 108 is a sensor member 111 which is freely movable up and down between walls 112, and which rests on the cigarettes beneath it. A similar member 113 is located above the chute defined by the walls 105 and 106. The member 111 acts to detect an excess or deficiency in the rate at which cigarettes are arriving from the bands 102 in relation to the rate at which they are being taken by the packing machine or machines. If there is an excess, the member 111 will be pushed upwards; this movement is utilised to actuate control means (not shown) by which the conveyors 108 and 109 are moved towards the left as viewed in the drawings, thus enlarging the capacity of the reservoir which can thus accommodate the excess of cigarettes. Similarly if there is a deficiency, the member 111 is lowered, and in reponse to this movement the conveyors 108 and 109 are moved to the right in the drawing, so that cigarettes move from the reservoir to make good the deficiency. The members 111 and 113 with their enclosing walls 112 themselves constitute small reservoirs which can accommodate small short-term fluctuations. The members 113 ensures that the space above the chutes 105, 106 is kept full of cigarettes.

The main reservoir, constitute by the conveyrs 108 and 109 and the back wall 110, is intended to accommodate large and continuing differences between the rate of supply and the rate of demand by the packing machine or machines, so as to enable cigarettes to move in a continuous flow from their source to their destination. If the rate of supply is greater than the rate of demand, excess cigarettes are received in the reservoir; conversely if it is smaller, cigarettes are drawn from the reservoir to satisfy the demand.

To allow the reservoir to accommodate a large accumulation of cigarettes without occuping too much floor space, it is arrranged in successive levels one above another as diagrammatically shown at the left-hand side of the drawing, wherein the conveyor 109 is shown as an ascending helix 115; the upper conveyor 108 terminates a short distance from the reservoir entry and a stationary cover is provided beyond it which follows the disposition of the conveyor 109. The conveyor 109 is in the form of a laterally flexible conveyor, for example as shown in FIGS. 12 to 17. The return run of the conveyor 109 can be guided in any convenient way; in the drawing the return run of the conveyor 109 is indicated diagrammatically at 119.

The conveyor 109 is shown as an ascending helix, but it can equally well be formed as a descending helix, if conditions are such that this is both practicable and desirable. Similarly, the conveyor 9 could, if desired, follow a helical path over part of its travel, followed by a path of different configuration, e.g. a staight, curved, or sinuous path, or any convenient combination of these. It will be appreciated that the most suitable configuration of the conveyor 109 will depend to some extent on the arrangement of the particular factory in which the apparatus is installed, and one of the advantages of a reservoir constructed in accordance with the invention is that it can easily be adapted to suit local conditions so as to avoid existing installations or structural features and also to avoid consituting an obstruction. The reservoir conveyor 109 could in principle wind its way around a factory in any desired fashion wherever there is space, preferably without moving upwards or downwards steeply (i.e. not over 10° to the horizontal) to avoid a risk of the cigarettes rolling about.

FIGS. 10 and 11 show another different system. The reservoir in this case is formed by a hollow upright cylindrical drum 230 around which there is a helical platform 232 which forms the floor of the reservoir. The pitch of the helix is such as to accommodate between turns a stack 234 of cigarettes or other rod-like articles lying radially.

A conveyor band 236 feeds the article stack tangentially to or from the reservoir. A thin stationary member 238 in FIG. 11A bridges the gap between the conveyor and the helical platform on the drum. While articles are being fed into the reservoir, the direction of movement of the conveyor and drum are as shown by arrows in FIG. 11A. These directions both reverse when the reservoir returns articles to the conveyor 236, during which stage a stationary scraper 240 guides the article stack off the helical platform and on to the conveyor.

As it rotates the drum must necessarily rise or fall, depending upon the direction of rotation, so as to advance axially during each revolution by an amount equal to the pitch of the helix. This is achieved by supporting the drum by means of a number of support rollers 242 on which an internal helial flange 244 in the drum rests, this helical flange having the same helix pitch as the platform 232 and being preferably aligned with the platform as shown; the support rollers are circumferentially spaced around a rim 246 on a circular member 248, and rotate about axes lying radially with respect to the drum, the height of the axes being appropriately varied in view of the slope of the helix. Rollers 250 circumferentially spaced around the circular member 248 roll against the inner surface of the drum to locate the drum laterally.

The drum is driven by a motor 252 mounted on a central column 254 which also carries the circular member 248. The drive is via a universal coupling 256 and a drive roller 258 mounted on the end of a shaft 260. The shaft passes through a vertical slot 261 in the rim 246 and is supported by a self-aligning bearing 262 which is urged downwards by a compression spring 264 to produce the necessary frictional driving reaction between the roller 258 and the upper surface of the flange 244 engaged by this roller.

FIG. 10 shows also a junction 265 at which a single row of cigarettes or other articles 266 is fed upwards by bands 267 and 269 into the horizontal stack of articles carried on one side by the conveyor 236 and on the other side by a conveyor 268. The conveyor 268 may for example lead via one or more similar junctions to one or more cigarette packing machines.

Above and opposite to the article input to the junction there is a vertically slidable sensor member 270 which is slidable between walls 271 and 273 and preferably controls the speed and direction of the conveyor 236; alternatively, the speed and direction of the conveyor 236 may in principle be controlled automatically in some other way, for example in response to the rate of delivery of articles by the bands 267 and 269, and the rate at which articles are absorbed by the packing machine or machines, while the walls 271 and 273 and the member 270 may serve primarily as a small variable-capacity reservoir to cater for short-term variations in the volume with which the articles require to occupy at the junction 265.

FIG. 11B shows an alternative way of feeding the stack to and from the reservoir. In place of the scraper there is a band 275 which extends tangentially against the inner face of the stack and winds up the drum alongside the stack of cigarettes on the drum, to an anchorage point at the top of the drum, so that the band 275 moves at the same speed as the stack entering or leaving the reservoir. In the other direction from a pulley 276 the band 275 extends tangentially towards the other side of the drum and winds down the drum to an anchorage at the bottom end of the drum. In addition there may be an endless band 277 passing round pulleys 278 and 279; the spacing between the bands 275 and 277 along their parallel runs may be such that the bands grip the stack of cigarettes between them to assist in carrying the cigarettes over the bridge member 238.

FIGS. 12 to 17 show in detail the laterally flexible conveyor used in the helical reservoir shown in FIGS. 1 and 2. The conveyor comprises a chain 324 connected to a conveyor surface member of plastic (shown alone in end view in FIG. 13) formed in a number of separately moulded sections joined together end-to-end. The surface member is moulded (for example from acetal or nylon) with slots 310 extending alternately from opposite edges so as to leave a series of parallel legs 312 joined together by edge portions 314 so as to form a close zig-zag shape. The cross-section of the legs is approximately square. Each surface member section has seventeen complete legs and a partial leg at each end, these partial legs being cut away respectively on the top (i.e. the leg 316 in FIG. 13) and underneath (i.e. the leg 318 in FIG. 13) so that the co-operating legs of two adjacent sections can form a lap joint. The partial leg 316 of each section has three projections 320 which engage in corresponding holes 321 in the partial leg 318 of the adjoining section. Each lap joint may be secured by an appropriate adhesive or by the application of heat, preferably by means of ultrasonics.

Figure 16:
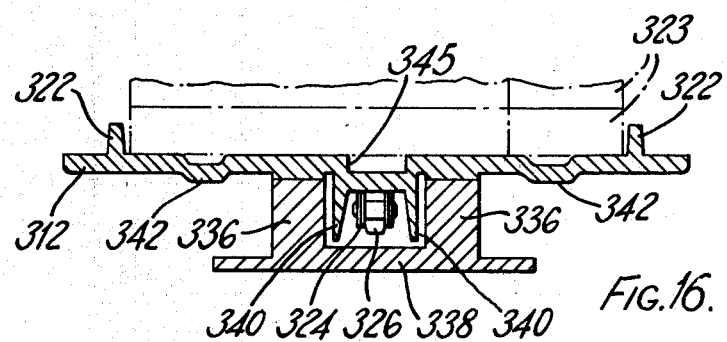
FIG. 16 is a section on the line XVI-XVI of FIG. 15, showing also the conveyor track.

Near the end of each leg 12 there is an upwardly extending projection 22. As shown in FIG. 1, the projections lie close together in rows so that they limit the lateral movememt of the cigarettes or other rod-articles carried by the conveyor. The articles are intended to lie across the conveyor, that is to say parallel to the legs 312, and they may be stacked up, for example to a height of 7 to 11 centimeters. FIG. 16 shows part of a stack of cigarettes 323 lying on the conveyor. The conveyor may however be used to carry a single row of cigarettes or other articles.

Figure 17:
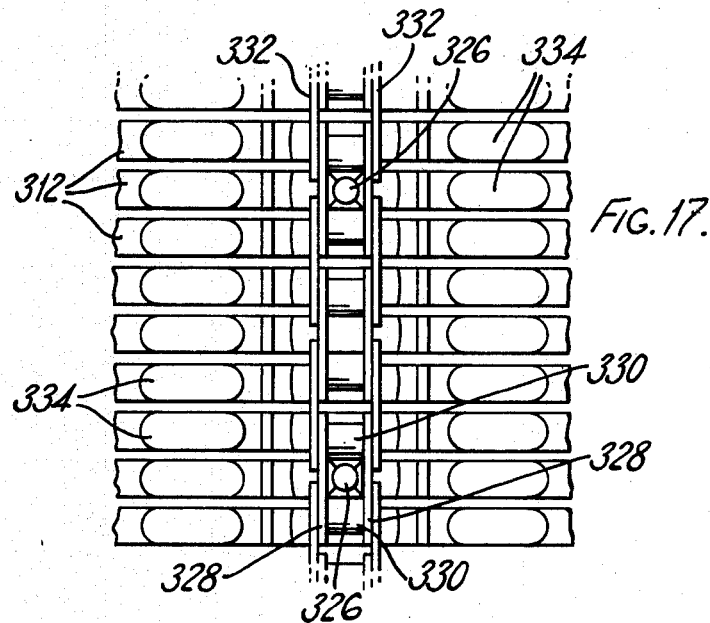
FIG. 17 is a fragmentary enlarged underneath view showing how the conveyor surface member is secured to the chain.

Along the center line of the conveyor, beneath the conveyor surface member, lies the chain 324 which drives the conveyor surface member. As shown in FIGS. 14 and 17, the chain is secured to the surface member by means of integral studs 326 on the surface member which project between each second pair of inner links 328 of the chain. The chain is of a known construction and has inner links 328 (see FIG. 17) secured together at opposite ends by tubular ferrules 30; outer pairs of links 32 connecting the inner links are themselves connected together near their opposite ends by lateral pins passing through the ferrules 330. Each section of the conveyor surface member has three studs 326. The arrangement is such that there is a stud 326 on every sixth leg 312.

The studs 326 may be secured to the chain by having their ends swaged over, for example with the application of heat.

Beneath each leg 312, on opposite sides of the centre line along which the chain extends, there are two protrusions 334 presenting the flat bottom surfaces which serve as bearing surfaces sliding on the opposite walls 336 of a conveyor track 338 (see FIG. 16). The walls 336 not only carry the conveyor, but also locate the conveyor laterally by co-operation with downwardly extending guide portions 340 on the legs. The track 338 may, for example, be an extruded plastic section, for example of nylon.

Figure 15:
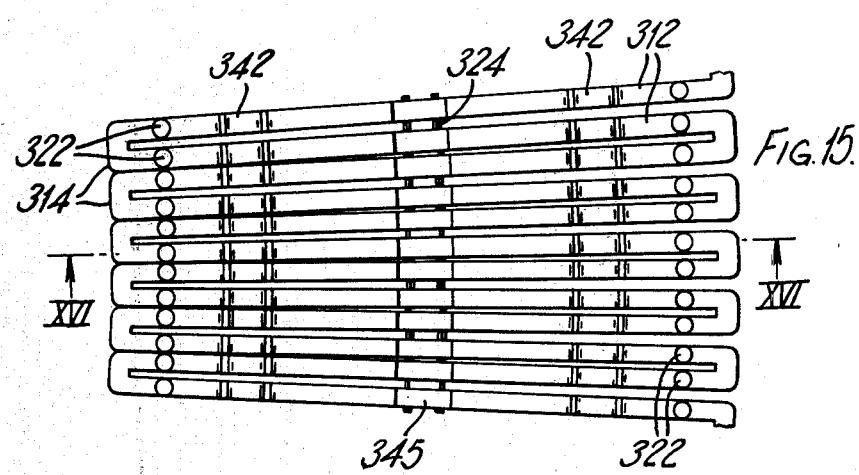
FIG. 15 is a plan view showing the conveyor in a laterally curved state.

FIG. 15 shows how the conveyor can curve laterally. It will be seen that this is accompanied by opening out of the slots on the outside of the curve (i.e. on the right as seen in FIG. 15), while the slots on the inside of the curve are reduced in width. The clearance between the links of chain enable the chain to follow the same curve. In the limiting position shown in FIG. 15, the legs touch at the inside of the curve. At this stage, it will be seen that, with the preferred arrangement shown, the width of the slots on the outside of the curve is still small in comparison with a cigarette diameter. The fact that there are slots into which the outer ends of the cigarettes (i.e. the ends on the outside of the curve) can drop slightly while the conveyor is curving round a corner assists in maintaining the cigarettes precisely radial with respect to the curve; this helps to ensure that the cigarettes are properly aligned laterally across the conveyor when they are delivered from the conveyor.

The lateral curvature shown in FIG. 15 is or may be such that the radius of curvature of the centre line of the conveyor is as little as approximately 40 centimeters.

Owing to the torsional flexibility of the legs of the conveyor surface member, the conveyor can be curved in the manner of a band conveyor passing round a pulley. Where the chain lies on the outside of the curve, the conveyor may pass round a pulley. On the other hand, when curving in the opposite sense (i.e. with the chain at a small radius) the conveyor may be supported simply by a driving or idling sprocket around which the chain engages, as shown in FIG. 5. The radius of the sprocket may be as small as 5 centimeters or even slightly smaller.

While it is being carried around one of the drums 604 and 605 of the reservoir shown in FIGS. 1 and 2, the conveyor surface member is supported on one side by one of the flanges 603 or 606, which extends up to the nearer row of guide portions 340, while a stationary rail (not shown) extends beneath the conveyor surface member near its outer edge to provide the necessary additional support; the rail is approximately curved so as to support the outer edge of the surface member all the way round the drum.

By way of example, the chain 24 may be a 6 mm or quarter inch bush chain.

To assist in guiding the cigarettes onto and away from the conveyor, the legs of the conveyor surface member have rows of offset portions 342 leaving upper recesses 344 into which stationary guide fingers can extend. For example, cigarettes may be delivered from a horizontal run of the curvable conveyor onto a conventional band conveyor via a stationary bridge which would include the necessary fingers extending into the recesses 344 to help the cigarettes in the curvable conveyor to pass over the stationary bridge while the curvable conveyor curves downwards round a return sprocket. Alternatively the bridge may have a single central finger projecting into the recess 345 shown in FIGS. 15 and 16. In this connection it should be noted that FIGS. 15 and 16 differ slightly from FIGS. 12 and 13 which do not show the recess 345. In order to be able to provide the recess 345 it is necessary to arrange that the overlapping parts 16 and 18 joining adjacent sections of the surface member together lie entirely to one side of the recess 345.

If the conveyor is intended to be curved only in one direction, one of the two rows of projections 322, namely the row on the inside of the curve, may be omitted as centrifugal force will prevent the cigarettes from sliding radially inwards; moreover there is a slight natural tendncy for a stack of cigarettes to be squeezed outwards on a curve.

Instead of the projections 322 being on the legs they may be on the edge portions 314, in which case there may be just one projection on each edge portion.

Different conveyors for use in connection with cigarettes or other rod-like devices of different lengths may consist of mouldings differing only in regard to the distances between the rows of projections 322. Accordingly, the bottom part of the die for each moulding may be common to all mouldings, the only different being in the top part of the die which determines the positions of the projections 322.

It is important to note that not every leg of the conveyor surface member is secured to the chain. The studs 326 securing the surface member to the chain are at substantial intervals, with several free legs between successive studded legs. This helps to ensure that the surface member is evenly stressed, especially when passing round a sprocket or pulley.

Figure 18:
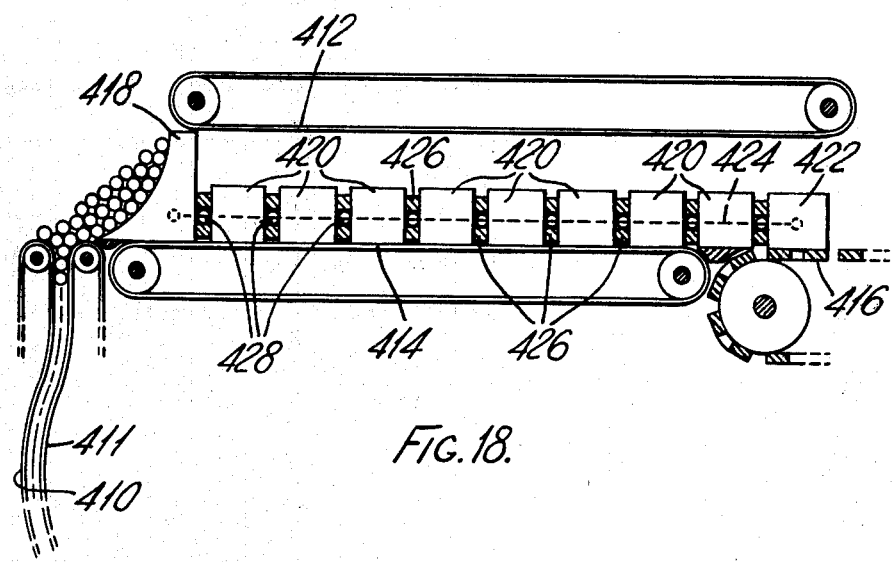
FIG. 18 shows an end wall drive for any of the reservoirs consisting of a laterally flexible conveyor.
Figure 19:
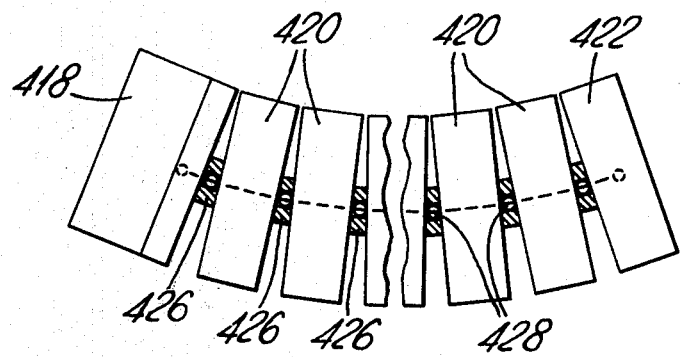
FIG. 19 is a plan view of the arrangement shown in FIG. 18.

FIGS. 18 and 19 show somewhat diagrammatically how the end wall defining the end of the stack of cigarettes in the reservoir may be connected for example to the conveyor 602 in the system shown in FIGS. 1 to 3. It should be noted however that FIGS. 18 and 19 use different reference numerals and show a mirror image in that the reservoir extends in the opposite direction from the elevator (i.e. as in FIG. 8B).

The object of this end wall connection is to enable the end wall to pass over the horizontal band adjacent to the elevator (i.e. the band 625 in FIG. 4) so that the system can, when necessary, be completely emptied of cigarettes on the reservoir side of the junction zone 627 in FIG. 4.

FIG. 18 shows two parallel bands 410 and 411 which form an elevator basically like that shown in FIG. 4 and carry the cigarettes to a junction from which they proceed in stack formation. The cigarette stack to the right of the junction is confined between upper and lower endless conveyor bands 412 and 414 which extend horizontally for approximately the same distance. Beyond the end of the lower conveyor 414, the cigarette stack is carried by a laterally flexible conveyor 416, for example as shown in FIGS. 12 to 17. There is no top wall confining the upper surface of the cigarette stack while it is on the conveyor 416.

During use, the end of the cigarette stack in the reservoir is defined by a movable end wall 418. This is connected by a series of spacer blocks 420 to a block 422 which is secured to the flexible conveyor 416. A flexible cord 424 passes through the spacer blocks 420 and has its opposite ends anchored respectively to the end wall 418 and end block 422.

Between the wall 418 and the blocks 420 and 422 there are spacer rings 426 which are of a soft sponge rubber or some other compressible material, and within these rings there are spherical beads 428. The cord 424 passes through the beads and rings.

The beads 428 space the blocks apart and provide pivot points between blocks. The rubber rings keep the blocks parallel while permitting the centre line of the chain of blocks to assume a curved state (as shown in FIG. 19), for example while passing round the reservoir drums 604 and 605 in FIGS. 1 and 2. During such movement the blocks 420 are located laterally, for example by the projections 322 on the flexible conveyor as shown in FIGS. 12 to 17, the width of the blocks being approximately equal to a cigarette length.

This arrangement enables the end wall 418 to pass over the conveyor 414 to the position shown in FIG. 18 when discharging cigarettes from the reservoir.

The beads 428 may be moulded integrally with the blocks 420, which may be of plastic. As a further alternative, the cord 424 may be omitted and the blocks 420 may be made to interlock with one another and with the end block 422 and wall 418. The interlocking should preferably be such as to permit each block to pivot with respect to the next about a vertical axis (to permit the movement shown in FIG. 19) and also about a horizontal axis to permit the chain of blocks to follow the conveyor 416 while it moves along a path which inclines upwards or downwards where necessary; if the blocks are of plastic, the interlocking may be such that the plastic flexes slightly when one block pivots with respect to the next.

FIGS. 20 and 21 show in solid outline a sensor mechanism which can be used in place of the double-plate sensor shown in FIG. 4, especially as a replacement for the sensor identified by the arrow IV in FIG. 8E. FIG. 20 also shows in broken outline a wall 518 which can be added to produce the form of sensor identified by the arrow XX in FIGS. 8B, 8C and 8E.

As shown in FIG. 20 in solid outline (i.e. ignoring the wall 518) a stack of cigarettes 510 is fed to the left by a conveyor 511 to a T junction which is completed by a continued horizontal stack 512, carried by a conveyor 513, and a vertical stack lying between side walls 514 and 515. The walls 514 and 515 constitute a chute down which the cigarettes are fed, for example to a packing machine. The conveyor 513 may carry the stack of cigarettes 512 towards a further chute or series of chutes feeding further packing machines. The conveyors 511 and 513 are in the form of endless conveyor bands, and they return round pulleys 516 and 517 as shown.

FIG. 20 shows basically a T junction, but it also shows in chain-dotted outline a convex end wall 518 which may be used to form a simple right-angle downward bend, that is to say a bend which feeds all the cigarettes from the stack 510 down the chute. In the case of a simple bend, it will be appreciated that the conveyor 513 and roller 517 would be omitted. As an alternative to the convex form shown, the wall 518 may be either flat or concave, depending upon the characteristics of the cigarettes being handled.

As shown particularly in FIG. 20, the sensor above the cigarettes at the T junction or bend is in the form of a convex plate 519 which is secured at its upstream end (i.e. in relation to cigarette flow) to a cylindrical member 520. This member 520 is carried by a spindle 521 (see FIG. 21) which is rotatably mounted in a speed regulating mechanism 522 via ball bearings (not shown). The ball bearings enable the plate 519 to rotate very freely so that it can respond rapidly under its own weight, which must be low in order not to apply more than the minimum pressure to the cigarettes.

FIG. 20 shows the right-hand end of the plate 519 with its bottom face just above the bottom face of a fixed top wall 523 confining the upper surface of the stack 510. However, the axis of the cylinder member 520 is preferably very slightly lower so that the bottom surface of the plate is just below that of the wall 523; nevertheless it will be appreciated that the plate 519 forms a fairly smooth continuation of the top wall 523.

A fixed plate 524 serves partly as a top wall confining the upper surface of the stack 512 for a short distance from the T junction, and is curved upwards towards its right-hand end so as to define a slightly converging channel for the stack 512 which helps to nest together the cigarettes of the stack 512. Also, as shown in FIG. 21, the right-hand end of the plate 524 has two slots, leaving three spaced legs 525, while the left hand end of the sensor plates 519 has a single central slot, leaving two spaced legs 526. The arrangement is such that the legs 526 of the plate 519 can pass through the slots between the legs 525 of the plate 524. Nevertheless the overlapping of the plates 524 and 519, as seen in FIG. 20, serves to prevent the escape of any cigarettes. As an alternative, the plate 519 may be unslotted, and the right-hand end portion of the plate 524 may be replaced by a plate which extends upwards and is curved about the axis of the cylindrical member 520 so that a fixed small clearance is maintained between that plate and the free end of the sensor plate 519.

The sensor plate 519 is shown in solid outline in FIG. 20 in approximately the middle of its range of movement, while chain-dotted outlines show approximately the upper and lower limits of its movement.

In use, the sensor 519 controls the speed of the conveyor 511. That is to say, as the sensor 519 rises as a result of a build-up of cigarettes beneath it, the resultant clockwise rotation of the member 520 causes the mechanism 522 to reduce the speed of the electric motor driving the conveyor 511; conversely, a drop in the height of the cigarettes beneath the sensor 519 allows the sensor to drop and results in an increase in the speed of the motor driving conveyor 511.

The mechanism 522 may be a known proprietary speedregulating mechanism and preferably provides for stepless speed control. Adjustment can be achieved, in the example shown, by loosening a screw 527 and then moving a pointer 528 to any desired position along a dial 529, after which the screw is again tightened; movement of the pointer 528 in fact rotates the case of the mechanism 522.

FIGS. 22 and 23 show a double-plate sensor for use above the elevator, for example at the positions indicated by the arrows XXII in FIG. 8. It should be noted however that FIGS. 22 and 23 show the sensor as a mirror image of sensors XXII in that the conveyor leading to the reservoir (i.e. the conveyor 15) extends in the opposite direction.

The sensor shown in FIGS. 22 and 23 consists of two sensor plates 10 and 11 which have downwardly convex portions 12 and 13 resting on a horizontal stack of cigarettes carried by two band conveyors 14 and 15. A single row of cigarettes is fed upwards into the junction zone below the plates 10 and 11 by two bands 17 and 18 which return over small idler pulleys 19 and 20. The conveyors 14 and 15 pass round further pulleys 21 and 22, and the horizontal surface on which the complete horizontal stack rests is completed by two small bridge pieces 23 and 24.

It will be seen that the convex parts 12 and 13 of the plates 10 and 11 lie on opposite sides of a vertical plane passing through the single row of cigarettes 16, this plane being the vertical centre line of the junction. Moreover, the plates 10 and 11 and the conveyors 14 and 15 form a symmetrical arrangement so that the function of the conveyors 14 and 15 can be interchanged.

The plates 10 and 11 are secured respectively to spindles 25 and 26 by which they are pivotably mounted. As shown in FIG. 23, the two plates are slightly staggered laterally and each has two slots leaving three legs 27, the arrangement being such that the legs of each plate can pass through the slots in the other plate. In other words, the plates interleaves with one another.

Outside the cigarette flow channel, the spindles 25 and 26 carry respectively two arms 28 and 29 which are connected by links 30 and 31 to the arms 32 and 33 of a bell-crank secured to a spindle 34 of a rotary speed-regulating mechanism 35 which controls the direction of rotation and the speed of a motor driving the conveyor 15. Each link 30 or 31 passes through a hole in the co-operating arm 32 or 33 and has end nuts so that it can transmit a pull from the arm 28 or 29 to the arm 32 or 33, as the case may be, but not a push. In other words, there is a lost-motion connection between each arm 28 or 29 and the arm 32 or 33 of the bell-crank. As a result of this lost-motion connection, the bell-crank position is determined by whichever of the plates 12 or 13 is in the lower position. The bell-crank is biased in an anti-clockwise direction, for example by the weight of the arm 32.

FIG. 22 shows the plates 12 and 13 in their lowest positions, while the highest possible positions are shown in chain dotted lines, the limit of upward movement being determine by stops 36 and 37. It is important to note that the volume (in terms of the number of cigarettes) lying between the uppermost and lowermost positions of the sensor plates is substantial, i.e. the same order as the average volume of the junction zone. This is significant as it means that the sensor also serves as a useful reservoir to allow for short-term variations in the rate of feed to and from the junction zone.

Plates 38 and 39 co-operate with the ends of the pivoted plates 12 and 13 to prevent the escape of cigarettes, and are appropriately slotted to interleave with the sensor plates. As shown in FIG. 22, the plate 38 at its lower end 38A extends horizontally for a short distance so as to serve as a top wal confining the upper surface of the stack of cigarettes for a short distance from the junction. The plate 39, on the other hand, merely curves upwards slightly to a point close to a band 50 which serves as a top wall confining the upper surface of the stack in the other direction from the junction.

In one possible example, the conveyor band 14 continuously carries to the left stack of cigarettes delivered by the bands 17 and 18, while the conveyor 15 serves as part of a reservoir which receives cigarettes (i.e. with the conveyor 15 moving to the right) when the upward supply of cigarettes 16 exceeds the rate of withdrawal of cigarettes by the conveyor 14; on the other hand, when the rate of withdrawal of cigarettes by the conveyor 14 exceeds the rate of supply to the junction by the bands 17 and 18, the conveyor 15 moves to the left so as to deliver cigarettes from the reservoir. The sensor in this case may control the speed and direction of movement of the conveyor 15, while another sensor (for example the sensor XX in FIG. 8B) may control the speed of the conveyor 14.

An important advantage of this double-plate sensor is that each plate can be made particularly sensitive to a drop in the level of cigarettes caused by an excessive delivery away from the junction by a conveyor beneath it or nearer to it. Considering for example a mode of operation in which, for the moment, the conveyor 15 is stationary-while the conveyor 14 is moving at a speed which exactly carries away the amount of cigarettes fed upwards by the bands 17 and 18; if then the speed of the conveyor 14 were to increase slightly, or if the rate of upward delivery of cigarettes by the bands 17 and 18 were suddenly to decrease, according to our observation this change would be most quickly manifested by a drop in the level of cigarettes at the end of the conveyor 14, that is to say adjacent to the stationary bridge piece 23. As a result a hollow would form in the upper surface of the stack of cigarettes, and the convex part 12 of the pivoted plate 11 is so shaped (as nearly as possible) that it will sink snugly into the hollow, thus rotating the spindle 34 of the speed-regulating mechanism 35 in a clockwise direction which causes the conveyor 15 to start moving to the left at a speed such as to meet the deficiency in the cigarette supply to the conveyor 14. If the double plate sensor were replaced by a single central sensor (i.e. lying directly above the bands 17 and 18), the response would be slower as the level of cigarette would take longer to fall away beneath such a centrally positioned sensor (and in a very extreme case might even fail to drop at all); in other words, the arrangement shown in the present application has a greater sensitivity.

In a different situation the conveyors 14 and 15 may, for example, both be moving away from the junction, and if then the rate of upward feed by the bands 17 and 18 were suddenly to decrease or stop (for exaple as a result of the cigarette-making machine stopping) there would be an immediate tendency for two hollows to appear in the upper surface of the stack above the ends of the conveyors 14 and 15 (i.e. beneath the convex parts 12 and 13 of the pivoted plates), so that both pivoted plates would drop and accordingly reduce the speed of the conveyor 15 or stop the conveyor 15 or even, in an extreme case, reverse the movement of the conveyor 15, the extreme case being where the supply of cigarettes 16 ceases so that the reservoir conveyor 15 must deliver the necessary cigarettes to the conveyor 14. In such a case, if the conveyor 15 was initially moving at a greater speed than the conveyor 14 then the level of cigarettes would tend to fall away more rapidly beneath the convex part 13 of the plate 10, so that the presence of a sensor plate immediately above the end of the conveyor 15 would in this case again give a greater sensitivity than would be possible with a single centrally positioned sensor.

The mechanism 35 in the example shown is a proprietary speed-regulating mechanism for motors which preferably provides for stepless speed control. It and the spindles 25 and 26 and the stops 36 and 37 are mounted on a side wall 51, as shown particularly in FIG. 23.

As an alternative to the elevator arrangement shown in FIG. 6, consisting of two bands moving along a sinuous path, the cigarettes may be gripped between two bands which move along a straight path and are backed by guiding surfaces, one or both of the bands having a coating of flexible sponge or other material to enable the cigarettes to be gripped gently. Yet another possibility is that both bands may move along parallel straight paths and one or both may be supported laterally (i.e. against movement away from the other band) by means of a guide carrying a layer of sponge or other flexible material (for example with a nylon or other low-friction facing) so that the backing is soft to enable the cigarettes to be gripped lightly by the bands.

In the case of a reservoir according to this invention which comprises a laterally flexible conveyor, for example the reservoir show in FIGS. 1 and 2, the conveyor may instead be constructed, for example, as described in either of British Pat. Nos. 1,089,295 and 1,135,792.

I claim:

1. In a conveyor system for feeding cigarettes or other rod-like articles of the cigarette industry sideways between an article-delivery device and an article-receiving device which receives the articles in multi-layer stack formation, a variable capacity reservoir comprising conveyor means including a laterally-flexible conveyor serving as the floor of the reservoir for carrying a reserve stack of cigarettes, means for guiding the conveyor along a path which includes at least one portion which curves laterally through approximately 180° and along which the conveyor is adapted to carry a portion of the reserve stack of articles in which the articles are oriented sideways to the direction of movement thereof along the said curved path, means for varying the length of the reserve stack in said reservoir by movement of the conveyor means, and means for defining the thickness of the reserve stack to form the reserve stack to a substantially uniform thickness along the whole length of the stack, the maximum length of the reserve stack being considerably greater than the thickness of the reserve stack.

2. A conveyor system according to claim 1, in which said path includes a plurality of lateral bends forming a series of vertically spaced convolutions.

3. A conveyor system according to claim 2 in which at least part of said path comprises a helix.

4. A conveyor system according to claim 1 including means for delivering the articles to the reservoir as a stack of uniform height along a substantially linear path at the same level as the floor of the reservoir, the articles remaining in the reservoir in the same stack formation and being carried out of the reservoir in approximately the same stack formation.

5. A conveyor system according to claim 1 in which said means for varying the length of the reserve stack in said reservoir by movement of said conveyor includes means for selectively moving said conveyor in opposite directions so that the articles enter the reservoir at one end and are discharged, when needed, from the same end.

6. A conveyor system according to claim 5 in which the conveyor carries a wall member which defines the end of the stack of articles in the reservoir and moves with the conveyor.

7. A conveyor system according to claim 5, further including means forming with said conveyor means a junction zone to which articles are delivered by said conveyor means and the article-delivery device and from which articles are delivered to the article-receiving device, and sensor means responsive to the pressure of the articles in said junction zone for controlling movement of the reservoir conveyor.

8. A conveyor system according to claim 7 in which the sensor means comprises two independently movable sensor members arranged to rest on the articles in the junction zone at adjacent positions, and a mechanism which controls the movement of the reservoir conveyor and is connected to the two sensor members so that its position is determined by whichever sensor member is lowest at any given moment.

9. A conveyor system according to claim 8 in which the sensor members each present a convex surface facing towards the junction zone.

10. A conveyor system according to claim 8, wherein said article-delivery device includes a delivery conveyor, said reservoir conveyor and said delivery conveyor extending in opposite directions from said junction zone, and in which the two sensor members are arranged to rest on the articles respectively in positions approximately above the opposing ends of said reservoir and delivery conveyors.

11. A conveyor system according to claim 1 further including means defining a junction zone, elevator means for delivering the articles upwards in a single row including an elevator comprising two parallel moving bands spaced substantially by the width of an article to deliver the articles upwards into the bottom of the junction zone in a single row in a generally upward direction from below the upper surface of the articles in the junction zone, a delivery conveyor operatively associated with said elevator for conveying the articles from the junction zone in stack formation and sensor means responsive to the articles supplied to the junction zone for controlling the speed of said delivery conveyor.

12. A conveyor system according to claim 11, wherein said elevator further includes means for constraining the parallel bands to move upwards along a curved sinuous path so that the cigarettes are gripped at any given position as a result of the tension in whichever band is on the outside of the curve at that particular position.

13. A conveyor system according to claim 11 in which the two bands of said elevator diverge as they approach the junction zone.

14. A conveyor system according to claim 11 in which the sensor comprises at least one member which is pivoted about a horizontal axis at or near one end and is arranged so that its other end will rest on the articles in the junction zone.

15. A conveyor system according to claim 1 in which said means defining the thickness of the reserve stack is formed by upper and lower parallel conveyors arranged at one end of said laterally flexible conveyor and means for driving said upper and lower conveyors at the same speed.

16. A cigarette conveyor system according to claim 1 in which said means defining the thickness of the stack of cigarettes carried by the reservoir is disposed to provide a substantially uniform stack of approximately 7 to 11 centimeters.

17. A conveyor system according to claim 1, further including means defining a junction zone at one end of the laterally flexible conveyor, sensing means for sensing the height of the articles in the junction zone, reversible drive means responsive to the sensing means for driving said laterally flexible conveyor selectively towards or away from the junction zone depending upon whether articles need to be delivered to or drawn from the junction zone, substantially vertical article delivery means having an upper end communicating with the junction zone, and horizontal conveyor means communicating at one end with the junction zone, at the side of the junction zone opposite to an adjacent end of the laterally flexible conveyor and at the same height, for conveying a stack of articles of substantially the same thickness as the reserve stack on the laterally flexible conveyor.

18. In a conveyor system for feeding cigarettes or other rod-like articles sideways between an article-delivery device and an article-receiving device, means defining a junction zone for receiving the articles, means for forming a continuous stack of the articles of predetermined height, a variable capacity reservoir for carrying a reserve portion of the stack of articles, the reservoir comprising a rotatable drum which carries a helical platform, means for moving said rotatable drum axially upwards or downwards upon rotation of the drum in respective directions, conveyor means for feeding the stack of articles tangentially onto the platform or for delivering the reserve stack of articles from the platform depending upon the direction of rotation of the drum, sensor means responsive to the height of the articles in the junction zone, and drive means responsive to said sensor means for rotating said drum in a direction dependent upon the height of the articles in the junction zone as determined by said sensor means.

19. A conveyor system as defined in claim 18 in which said drive means for said rotatable drum is located within said drum and said helical platform is located on the outer surface of said drum.

20. A reservoir for selectively receiving and discharging a mass of cigarettes or other rod-like articles of the cigarette industry, comprising an endless laterally-flexible reservoir conveyor extending along a path including a plurality of turns formed by lateral curves at successive levels one above the other, means for delivering articles onto the reservoir conveyor at one end in the form of a predetermined multi-layer sideways-moving stream of the said articles, and means for receiving articles from the reservoir conveyor at said one end of the reservoir in the form of substantially the same predetermined multi-layer stream, and means to selectively move said conveyor in opposite directions to accumulate a long reserve stream of the articles of variable quantity in the reservoir and selectively feed articles into and out of the reservoir with the minimum of disturbance.

21. A reservoir according to claim 20 in which the laterally flexible conveyor means is disposed along a path which includes a helical portion.

22. A conveyor system for feeding cigarettes or other similar rod-like articles sideways from an article-delivery device to an article-receiving device which receives the articles in stack formation, comprising means for forming a stack of predetermined thickness from the articles delivered by the article-delivery device; means defining a junction zone; conveyor means for feeding the said stack of predetermined thickness into said junction zone extending substantially horizontally toward the junction zone at a predetermined level; sensing means for sensing the volume of articles in the junction zone; a reservoir having its floor formed by a reversible conveyor having at least one lateral curve, one end of which is situated adjacent to the junction zone, is substantially horizontal and is at the same level as said conveyor means; means controlling movement of said reversible conveyor in opposite directions so as to draw from the junction zone a stack of articles of substantially the same predetermined thickness in response to a signal from the sensing means that the volume of articles in the junction zone is relatively large, and to deliver the said stack back into the junction zone in response to a signal from the sensing means that the volume of articles in the junction zone is relatively small, the thickness of the stack on the reversible conveyor being defined by a top band contacting the upper surface of the stack; and a discharge channel extending downwards from the junction zone for delivering to the article-receiving means a stack of articles, said discharge channel having a thickness approximately equal to said predetermined thickness of the stack delivered to and from the junction zone by the said conveyor means and reservoir.

23. A conveyor system according to claim 22 including an end wall movable with the reversible conveyor to define and control the end of the stack of articles on the said conveyor remote from the junction zone.

24. A conveyor system according to claim 22 in which the reversible conveyor comprises a laterally flexible conveyor which moves along a helical path.

25. A mass flow conveyor system for feeding cigarettes or other similar rod-like articles of the cigarette industry sideways from an article-delivery device to an article-receiving device, including means defining a junction zone, a first horizontal overhead conveyor arranged to carry a stack of articles of predetermined thickness into said junction zone at one end thereof which is situated adjacent to said junction zone; means for supplying articles from said article-delivery device to said first conveyor; means defining an article flow channel extending downwards from said junction zone; a reservoir having its floor formed by a second overhead conveyor which is reversible and having one end extending horizontally from the junction zone on the side opposite to the first conveyor and at substantially the same level therewith, drive means for moving said second overhead conveyor in opposite directions to selectively draw articles from the junction zone which have been supplied thereto from said first conveyor or deliver articles into the junction zone for movement to said article flow channel; top wall means for setting the thickness of the stack of articles on the second conveyor at substantially said predetermined thickness at least at the end thereof adjacent said junction zone, said junction zone being unobstructed so as to permit articles to pass freely in said stack formation from said first conveyor through said junction zone to said second conveyor without materially changing direction; and sensor means for controlling said drive means to regulate the direction of motion of said second conveyor on the basis of the articles supplied to said junction zone.

26. A conveyor system according to claim 25, in which the sensor means comprises a movable wall member mounted above the junction zone at approximately the same mean height as said top wall means and being movable in response to the height of the articles in the junction zone, and including means for controlling the direction and speed of the second overhead conveyor in response to the position of said movable wall member.

27. A conveyor system as defined in claim 25, in which said article flow channel comprises a discharge channel for delivering to the article-receiving device a stack of articles having a thickness approximately equal to said predetermined thickness of the stack delivered to and from the junction zone by said first and second conveyors.

28. A conveyor system as defined in claim 27, in which said means for setting the thickness of the stack of articles on the second conveyor is formed by upper and lower parallel conveyors arranged between the end of said second conveyor and said junction zone and means for driving said upper and lower conveyors at the same speed.

29. A mass flow conveyor system for feeding cigarettes or other similar rod-like articles of the cigarette industry sideways from an article-delivery device to an article-receiving device, including means defining a junction zone, a first horizontal overhead conveyor arranged to carry articles into said junction zone at one end thereof which is situated adjacent to said junction zone; means for supplying articles from said article-delivery device to said first conveyor; means defining an article flow channel extending downwards from said junction zone; a reservoir having its floor formed by a second overhead conveyor having one end thereof extending horizontally from the junction zone on the side opposite to the first conveyor at substantially the same level therewith and at least part of which extends along a helical path, drive means for moving said second overhead conveyor in opposite directions to selectively draw articles from the junction zone or deliver articles into the junction zone; and sensor means for controlling said drive means to regulate the direction of motion of said second conveyor on the basis of the articles supplied to said junction zone.

30. A mass flow conveyor system for feeding cigarettes or other similar rod-like articles of the cigarette industry sideways from an article-delivery device to an article-receiving device, including means defining a junction zone, a first horizontal overhead conveyor arranged to carry a stack of articles of predetermined thickness into said junction zone and communicating at one end thereof with said junction zone; means defining an article flow channel communicating with said junction zone; a reservoir having its floor formed by a second overhead conveyor having one end thereof extending horizontally from the junction zone on the side opposite to the first conveyor and at substantially the same level therewith, the second overhead conveyor comprising a laterally-flexible conveyor which moves along a path including at least one lateral bend; drive means for moving said second overhead conveyor in opposite directions to selectively draw articles from the junction zone or deliver articles into the junction zone; top wall means for setting the thickness of the stack of articles on the second conveyor at substantially said predetermined thickness at least at the end thereof adjacent said junction zone; and sensor means for controlling said drive means to regulate the direction of motion of said second conveyor on the basis of the articles supplied to said junction zone.

31. A mass flow conveyor system for feeding cigarettes or other rod-like articles of the cigarette industry sideways from an article-delivery device to an article-receiving device, comprising a chute for the downward delivery of articles to an article-receiving device; a reversible conveyor extending substantially horizontally from a junction zone above the upper end of the chute and forming a variable capacity reservoir, said reversible conveyor comprising a laterally flexible conveyor which moves along a path including at least one lateral bend; sensor means responsive to the articles supplied to said junction zone for controlling the direction of motion of the reversible conveyor; and a delivery conveyor for delivering articles in stack formation into the junction zone from the side opposite to the reversible conveyor; at least a portion of the delivery conveyor adjacent to the junction zone being at substantially the same height as the adjacent end of the reversible conveyor, whereby articles can pass from the delivery conveyor to the reversible conveyor in stack formation without materially changing direction while moving through the junction zone.

32. In a conveyor system for feeding cigarettes or other rod-like articles sideways between an article-delivery device and an article-receiving device which receives the articles in stack formation of predetermined thickness, a variable-capacity reservoir for absorbing or making up the difference between the rates at which the articles are delivered and received, comprising a laterally flexible conveyor arranged to carry a stack of articles along a path including one or more lateral bends and which serves as the floor of the reservoir, means for moving said conveyor in selective opposite directions for a variable length according to the capacity required of the reservoir, and means for defining the thickness of the stack of articles carried by the laterally flexible conveyor to form a reserve stack of substantially uniform thickness along the whole length of the stack and having a thickness approximately equal to the thickness of the stack fed to the article-receiving device, further including means defining a junction zone at one end of the laterally flexible conveyor, sensing means for sensing the articles supplied to the junction zone, reversible drive means responsive to the sensing means for driving said laterally flexible conveyor selectively towards or away from the junction zone depending upon whether articles need to be delivered to or drawn from the junction zone, substantially vertical article delivery means having an upper end communicating with the junction zone, and horizontal conveyor means communicating at one end with the junction zone, at the side of the junction zone opposite to an adjacent end of the laterally flexible conveyor and at the same height, for conveying a stack of articles of substantially the same thickness as the reserve stack on the laterally flexible conveyor.

33. In a conveyor system for feeding cigarettes or other rod-like articles sideways between the article-delivery device and an article-receiving device, a variable-capacity reservoir comprising conveyor means for carrying a reserve stack of articles of predetermined thickness, means for guiding the conveyor means along a path which includes a plurality of portions extending in one direction and in an opposite direction, means defining a junction zone in communication with one end of the conveyor means, means for feeding into the junction zone a stack of articles, means for feeding articles from the junction zone to the article-receiving device, sensing means for sensing the quantity of articles in the junction zone, and means for varying the length of the reserve stack of articles in the reservoir by movement of the conveyor means in opposite directions in response to the sensor means.

34. A conveyor system for feeding cigarettes or other rod-like articles sideways comprising a horizontal conveying means for conveying said articles as a stack having a predetermined height to a junction zone, a variable-capacity reservoir communicating at one end with said junction zone for conveying a stack of articles of substantially the same height as the stack on the horizontal conveying means, a substantially vertical article-delivery means having an upper end communicating with said junction zone between the horizontal conveying means and the variable-capacity reservoir and means for sensing the height of articles in said junction zone and selectively driving the reservoir towards or away from the junction zone depending upon whether articles need to be delivered to or drawn from the junction zone; said variable-capacity reservoir comprising a laterally-flexible conveyor serving as a floor of the reservoir and having a substantially horizontal portion at said one end of the reservoir at substantially the same level as the horizontal conveying means, and means for guiding said conveyor along a path which includes at least one portion which curves laterally through approximately 180° about a center of curvature and along which the conveyor carries said stack such that the axes of said articles are directed substantially towards said center of curvature.

35. A conveyor system for feeding cigarettes or other similar rod-like articles of the cigarette industry sideways from an article-delivery device to an article-receiving device which receives the articles in stack formation, comprising means for forming a stack of predetermined thickness from the articles delivered by the article-delivery device and for conveying said stack of articles along a substantially horizontal path into a junction zone; sensing means for sensing the volume of articles in the junction zone; a reservoir having its floor formed by a reversible conveyor, one end of which is situated adjacent to the junction zone, is substantially horizontal and is at substantially the same level as the stack of articles being delivered into the junction zone by said stack forming and conveying means, said junction zone being unobstructed so that said stack of articles is capable of moving directly through said junction zone from said stack forming and conveying means and into said reservoir without significant change in direction; means controlling movement of said reversible conveyor in opposite directions so as to draw articles from the junction zone as a stack of said predetermined thickness in response to a signal from the sensing means that the volume of articles in the junction zone is relatively large, and to deliver the said stack back into the junction zone in response to a signal from the sensing means that the volume of articles in the junction zone is relatively small; a top wall contacting the upper surface of the stack of articles in said reservoir at least at the end thereof adjacent said junction zone to define the thickness of the stack on said reversible conveyor as said predetermined thickness; and a discharge channel extending downwards from the junction zone for delivering to the article-receiving means a stack of articles; said sensor means comprising a movable wall member confining the upper surface of the articles in the junction zone at approximately the same mean height as said top wall in said reservoir.

36. A mass flow conveyor system for feeding cigarettes or other rod-like articles of the cigarette industry sideways from an article-delivery device to an article-receiving device, comprising a chute for the downward delivery of articles to an article-receiving device; a reversible conveyor extending substantially horizontally from a junction zone above the upper end of the chute and forming a variable capacity reservoir; top wall means for confining the upper surface of the articles on the reversible conveyor at a predetermined height above the reversible conveyor; a delivery conveyor for delivering articles in stack formation into the junction zone from the side opposite to the reversible conveyor; at least a portion of the delivery conveyor adjacent to the junction zone being at substantially the same height as the adjacent end of the reversible conveyor and said junction zone being unobstructed, whereby articles can pass from the delivery conveyor to the reversible conveyor in stack formation without materially changing the direction while moving through the junction zone; further top wall means for confining the upper surface of the articles on the delivery conveyor at approximately said predetermined height above the delivery conveyor; and sensor means responsive to the articles supplied to said junction zone for controlling the direction of motion of the reversible conveyor, said sensor means comprising a movable wall member confining the upper surface of the articles in the junction zone at approximately the same mean height as the said top wall means and further top wall means so as to facilitate the transfer of a continuous stack of said predetermined height through said junction zone and into said reservoir.

37. A mass flow conveyor system for feeding cigarettes or other similar rod-like articles of the cigarette industry sideways from an article-delivery device to an article-receiving device, including means defining a junction zone, a first horizontal overhead conveyor arranged to carry a stack of articles of predetermined thickness away from said junction zone and communicating at one end thereof with said junction zone; means defining an article flow channel communicating with said junction zone including means for delivering articles upwards through the said article flow channel and into the junction zone; a reservoir having its floor formed by a second overhead conveyor having one end thereof extending horizontally from the junction zone on the side opposite to the first conveyor and at substantially the same level therewith, the second overhead conveyor comprising a laterally-flexible conveyor which moves along a path including at least one lateral bend; drive means for moving said second overhead conveyor in opposite directions to selectively draw articles from the junction zone or deliver articles into the junction zone; top wall means for setting the thickness of the stack of articles on the second conveyor at substantially said predetermined thickness at least at the end thereof adjacent said junction zone; and sensor means for controlling said drive means to regulate the direction of motion of said second conveyor on the basis of the articles supplied to said junction zone.

* * * * *